US011338613B2

(12) United States Patent
Xu et al.

(10) Patent No.: US 11,338,613 B2
(45) Date of Patent: *May 24, 2022

(54) WHEEL AND RIM WITH WEIGHT REDUCTION SOCKETS

(71) Applicant: CITIC Dicastal CO., LTD., Hebei (CN)

(72) Inventors: Zuo Xu, Qinhuangdao (CN); Zhen Li, Qinhuangdao (CN); Xu Wang, Qinhuangdao (CN); Kaiqing Wang, Qinhuangdao (CN); Yule Zhou, Qinhuangdao (CN); Chuan Cheng, Qinhuangdao (CN); Changhai Li, Qinhuangdao (CN); Tiefeng Hu, Qinhuangdao (CN); Hui Chi, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 397 days.

This patent is subject to a terminal disclaimer.

(21) Appl. No.: 16/205,530

(22) Filed: Nov. 30, 2018

(65) Prior Publication Data

US 2019/0270336 A1   Sep. 5, 2019

(30) Foreign Application Priority Data

Mar. 5, 2018 (CN) .......................... 201820299234.4

(51) Int. Cl.
*B60B 21/00* (2006.01)
*B60B 3/10* (2006.01)

(52) U.S. Cl.
CPC ................. *B60B 21/00* (2013.01); *B60B 3/10* (2013.01); *B60B 2360/104* (2013.01); *B60B 2900/111* (2013.01)

(58) Field of Classification Search
CPC .... B60B 3/10; B60B 21/026; B60B 2900/111
See application file for complete search history.

(56) References Cited

U.S. PATENT DOCUMENTS 5,826,949 A * 10/1998 Bortoloni .................. B60B 3/06
                                                    301/95.107
6,983,901 B2 * 1/2006 Bitton ...................... C22B 7/005
                                                    241/24.14

(Continued)

FOREIGN PATENT DOCUMENTS

JP        H11192804 A  *  7/1999 ............. Y02T 10/86

*Primary Examiner* — Jason R Bellinger
*Assistant Examiner* — Emily G Castonguay
(74) *Attorney, Agent, or Firm* — Cooper Legal Group, LLC

(57) ABSTRACT

A wheel and a rim with weight reduction sockets are provided. The rim includes an inner flange, a middle portion and an outer flange, the inner flange, middle portion and outer flange are all annular and are connected end to end to form a cylindrical rim, in which the middle portion of the rim includes weight reduction sockets; and the weight reduction sockets are of regular hexagons, and are arranged adjacently on the outer side of the middle portion of the rim in the shape of a honeycomb. The weight of the hub is reduced by designing the weight reduction sockets in a specific shape for the outer rim of the hub and selecting the size of the weight reduction sockets.

12 Claims, 3 Drawing Sheets

(56) References Cited

U.S. PATENT DOCUMENTS

| | | | |
|---|---|---|---|
| 2006/0017316 A1* | 1/2006 | Rodrigues | B60B 21/026 301/95.101 |
| 2012/0286562 A1* | 11/2012 | Ono | B60B 21/026 301/95.101 |
| 2018/0319208 A1* | 11/2018 | Seung | B60B 21/026 |

* cited by examiner

WHEEL AND RIM WITH WEIGHT REDUCTION SOCKETS

CROSS-REFERENCE TO RELATED APPLICATION

The present application claims benefit of Chinese Patent Application No. 201820299234.4, filed on Mar. 5, 2018, the contents of which are hereby incorporated by reference in its entirety.

BACKGROUND

As natural resources shrink, the direction of development of modern automobile industry technology is to further reduce the weight of automobiles, reduce the consumption of fuels and reduce the emission of exhaust.

Aluminum alloy hubs have won the favor of more and more private car owners by attractive appearance, safety, comfort and other characteristics. The lightweight design of the rim of the aluminum alloy hub is to optimize the design of the rim structure under the predetermined use environment and load condition, thereby reducing the weight of the hub and meeting the reliability and basic performance of the hub.

Thus, it has been desirable in the art to balance the weight reduction and the mechanical strength by reducing the weight of the hub as much as possible on the premise that the strength of the aluminum alloy hub is ensured by a specific outer rim weight reduction design.

SUMMARY

The disclosure relates to the technical field of automobile parts, and specifically, relates to a weight reduction solution for an aluminum alloy hub with an outer rim having hexagonal weight reduction sockets.

The disclosure provides a rim with weight reduction sockets to overcome the above difficulties.

Unless otherwise stated, the wheel and the rim of the disclosure are made of an aluminum alloy, specifically, are casted with A356.2 aluminum alloy.

Unless otherwise stated, in the disclosure, "wheel" and "hub" are intended to express the same meaning, i.e., a wheel ring made of an aluminum alloy, including a wheel disc and a rim. The wheel disc and the rim may be combined by bolts, welding, snapping or other method, or integrally formed.

In one aspect of the disclosure, provided is a rim with weight reduction sockets, the rim being made of an aluminum alloy and including an inner flange, a middle portion and an outer flange, the inner flange, middle portion and outer flange are all annular and are connected end to end to form a cylindrical rim, in which the middle portion of the rim includes weight reduction sockets; and the weight reduction sockets are of equilateral hexagons, and are arranged adjacently on the outer side of the middle portion of the rim in the shape of a honeycomb.

In one aspect of the disclosure, the side lengths of the equilateral hexagons of the weight reduction sockets are 15-40 mm, the depths of the weight reduction sockets are 0.5-2.0 mm, and the distances between the adjacent weight reduction sockets are 3-10 mm.

In a preferred aspect of the disclosure, the equilateral hexagons of the weight reduction sockets are arranged in such a manner that one angle is perpendicular to a wheel disc of a wheel, and 2-4 rows of equilateral hexagonal weight reduction sockets are arranged at the middle portion of the rim.

In a preferred aspect of the disclosure, the angles of the weight reduction sockets are fillet angles.

In a preferred aspect of the disclosure, the middle portion of the rim further includes ribbed bulges, and the ribbed bulges are located on the outer side of the middle portion of the rim and are perpendicular to the wheel disc of the wheel.

In a preferred aspect of the disclosure, 4-6 ribbed bulges are uniformly distributed on the circumference of the rim, and each ribbed bulge has a width of 8-14 mm and a height of 1-3 mm.

In a preferred aspect of the disclosure, the aluminum alloy is A356.2 aluminum alloy.

In another aspect of the disclosure, further provided is a wheel having the above rim.

The weight of the hub is reduced by designing the weight reduction sockets in a specific shape for the outer rim of the hub and selecting the size of the weight reduction sockets. In addition, the hub after weight reduction still has excellent mechanical properties, meets the American Wheel Standards of SAE J175 and SAE J328-2005, namely meets the performance requirements for 13-degree impact strength, 90-degree impact strength, radial impact, radial fatigue and bending fatigue, and also meets the requirements of GB/T 5334-2005 and GB/T 15704-1995 for wheel strengths and fatigues.

BRIEF DESCRIPTION OF DRAWINGS

The embodiments of the disclosure will be described in detail below in combination with the accompanying drawings, in which.

LIST OF REFERENCE SYMBOLS

Figure 1:
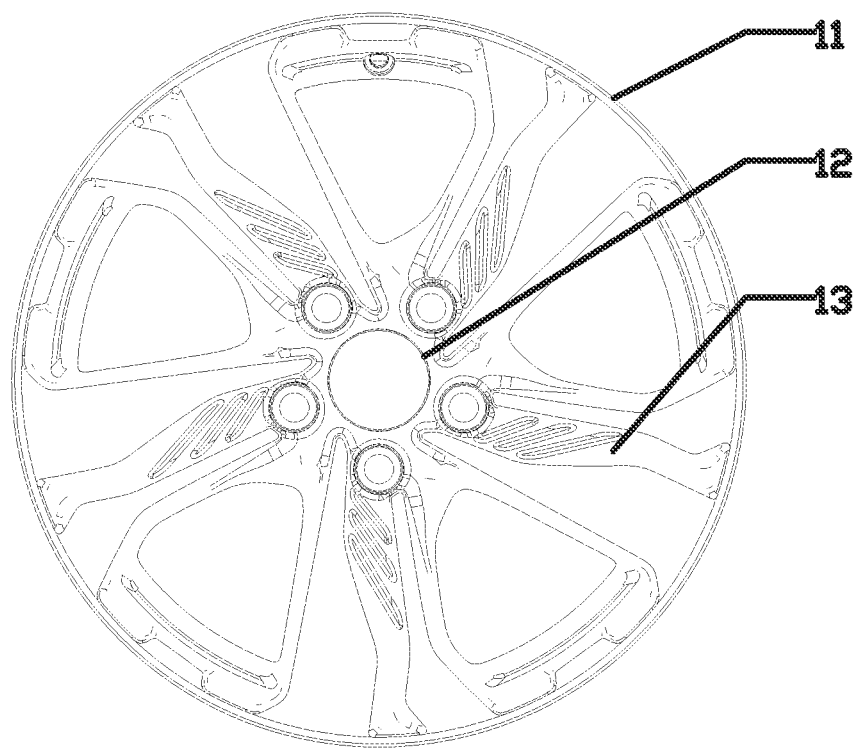
FIG. 1 is a schematic diagram of a front structure of a hub according to first embodiment of the disclosure.
Figure 2:
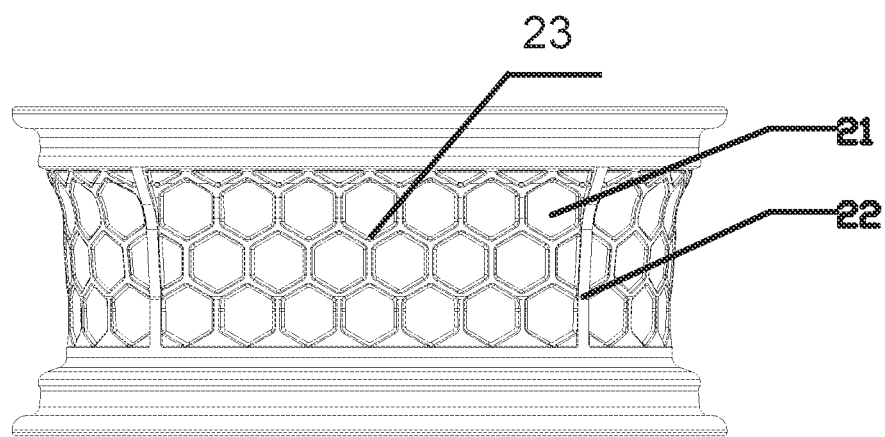
FIG. 2 is a schematic diagram of a back structure of the hub according to first embodiment of the disclosure.
Figure 3:
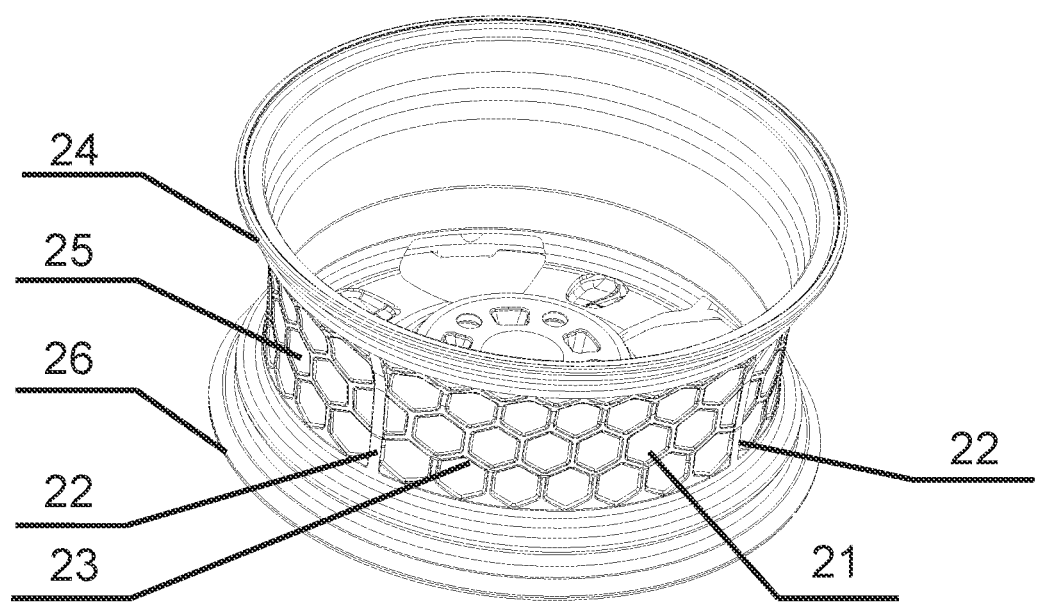
FIG. 3 is a three-dimensional structure diagram of the hub according to first embodiment of the disclosure.

11—rim, 12—flange plate, 13—spoke, 21—weight reduction socket, 22—ridged bulge, 23—fillet angles, 24—inner flange, 25—middle portion of the rim, 26—outer flange.

DETAILED DESCRIPTION

First Embodiment

The present embodiment provides a motor vehicle aluminum alloy hub with an outer rim having weight reduction sockets. The hub includes a wheel disc and a rim 11, and the wheel disc includes a flange plate 12, a flange plate periphery portion and spokes 13. Weight reducing sockets 21 are provided on the outer side of the rim 11 of the hub, the single weight reduction socket 21 of the rim 11 is in a shape of equilateral hexagon, the side length of the equilateral hexagon is 21 mm, the weight reduction sockets 21 have a depth of 2.5 mm, internal fillet angles 23 of R2, a rib width of 4 mm and a rib height of 1.5 mm; and four side form joint ridges of 10 mm are provided. By test, the weight of the hub is 11.29 kg in the absence of weight reduction sockets and is reduced by 0.95 kg in the presence of weight reduction sockets, and the weight reduction effect is about 8.4%.

Second Embodiment

Various properties of the motor vehicle hub of first embodiment were tested. The strengths and fatigues, including 13-degree impact strength, 90-degree impact strength, radial impact, radial fatigue, bending fatigue and the like, of the above wheel were tested in the test center of Dicastal. The tests show that the hub meets American Wheel Standards of SAE J175 and SAE J328-2005, namely meets the performance requirements for 13-degree impact strength, radial fatigue and bending fatigue, and also meets the requirements of GB/T 5334-2005 and GB/T 15704-1995 for wheel strengths and fatigues.

The invention claimed is:

1. A rim with weight reduction sockets, the rim being made of an aluminum alloy and comprising an inner flange, a middle portion and an outer flange, the inner flange, the middle portion and the outer flange are all annular and are connected end to end to form a cylindrical rim, wherein the middle portion of the rim comprises the weight reduction sockets; and the weight reduction sockets are equilateral hexagons, and are arranged adjacently on an outer side of the middle portion of the rim in the shape of a honeycomb, wherein
4-6 ribbed bulges are uniformly distributed on a circumference of the rim, and each ribbed bulge of the 4-6 ribbed bulges has a width of 8-14 mm and a height of 1-3 mm.

2. The rim with the weight reduction sockets according to claim 1, wherein side lengths of the equilateral hexagons of the weight reduction sockets are 15-40 mm, depths of the weight reduction sockets are 0.5-2.0 mm, and distances between adjacent weight reduction sockets are 3-10 mm.

3. The rim with the weight reduction sockets according to claim 1, wherein angles of the weight reduction sockets are fillet angles.

4. The rim with the weight reduction sockets according to claim 1, wherein the 4-6 ribbed bulges are located on the outer side of the middle portion of the rim and are perpendicular to a wheel disc of a wheel.

5. The rim with the weight reduction sockets according to claim 1, wherein the aluminum alloy is A356.2 aluminum alloy.

6. An aluminum alloy wheel comprising a rim with weight reduction sockets, the rim being made of an aluminum alloy and comprising an inner flange, a middle portion and an outer flange, the inner flange, the middle portion and the outer flange are all annular and are connected end to end to form a cylindrical rim, wherein the middle portion of the rim comprises the weight reduction sockets; and the weight reduction sockets are equilateral hexagons, and are arranged adjacently on an outer side of the middle portion of the rim in the shape of a honeycomb, wherein
4-6 ribbed bulges are uniformly distributed on a circumference of the rim, and each ribbed bulge of the 4-6 ribbed bulges has a width of 8-14 mm and a height of 1-3 mm.

7. The aluminum alloy wheel according to claim 6, wherein side lengths of the equilateral hexagons of the weight reduction sockets are 15-40 mm, depths of the weight reduction sockets are 0.5-2.0 mm, and distances between adjacent weight reduction sockets are 3-10 mm.

8. The aluminum alloy wheel according to claim 6, wherein angles of the weight reduction sockets are fillet angles.

9. The aluminum alloy wheel according to claim 6, wherein the 4-6 ribbed bulges are located on the outer side of the middle portion of the rim and are perpendicular to a wheel disc of the aluminum alloy wheel.

10. The aluminum alloy wheel according to claim 6, wherein the aluminum alloy is A356.2 aluminum alloy.

11. The rim with weight reduction sockets according to claim 1, wherein the equilateral hexagons of the weight reduction sockets are arranged in such a manner that a diagonal line of the equilateral hexagon of each of the weight reduction sockets is perpendicular to a wheel disc of a wheel, and 2-4 rows of regular hexagonal weight reduction sockets are arranged at the middle portion of the rim.

12. The aluminum alloy wheel according to claim 6, wherein the equilateral hexagons of the weight reduction sockets are arranged in such a manner that a diagonal line of the equilateral hexagon of each of the weight reduction sockets is perpendicular to a wheel disc of the aluminum alloy wheel, and 2-4 rows of regular hexagonal weight reduction sockets are arranged at the middle portion of the rim.

* * * * *